United States Patent
Eikenes et al.

(10) Patent No.: US 11,205,087 B2
(45) Date of Patent: Dec. 21, 2021

(54) INTELLIGENT WHITEBOARD COLLABORATION SYSTEMS AND METHODS

(71) Applicant: HUDDLY AS, Oslo (NO)

(72) Inventors: Anders Eikenes, Bekkestua (NO); Stein Ove Eriksen, Oslo (NO); Jan Tore Korneliussen, Oslo (NO); Eamonn Shaw, Gamle Fredrikstad (NO)

(73) Assignee: HUDDLY AS, Oslo (NO)

( * ) Notice: Subject to any disclaimer, the term of this patent is extended or adjusted under 35 U.S.C. 154(b) by 0 days.

(21) Appl. No.: 16/458,062

(22) Filed: Jun. 30, 2019

(65) Prior Publication Data

US 2019/0325253 A1    Oct. 24, 2019

Related U.S. Application Data

(63) Continuation of application No. 15/632,953, filed on Jun. 26, 2017, now Pat. No. 10,387,747.

(51) Int. Cl.
*G06K 9/00* (2006.01)
*G06K 9/46* (2006.01)
(Continued)

(52) U.S. Cl.
CPC ........... *G06K 9/4652* (2013.01); *G06F 21/32* (2013.01); *G06K 9/00402* (2013.01); *G06K 9/38* (2013.01);
(Continued)

(58) Field of Classification Search
CPC ...... G06F 3/017; G06F 3/0236; G06F 3/0304; G06F 3/0325; G06F 3/0346;
(Continued)

(56) References Cited

U.S. PATENT DOCUMENTS 6,144,991 A * 11/2000 England ................. H04L 29/06
709/205
6,473,794 B1 * 10/2002 Guheen ................... H04L 41/22
709/223

(Continued)

*Primary Examiner* — Alex Kok S Liew
(74) *Attorney, Agent, or Firm* — Edgetech Law LLP

(57) ABSTRACT

Systems and methods are provided for capturing time-stamped data from whiteboard video signals and producing high-resolution whiteboard images. Local patches around a multitude of pixels in the whiteboard are used in classifying background white pixels and foreground color pixels for each foreground marker color. Clustering is performed in alternative color spaces globally and locally in defining background white and each foreground marker color. Color normalization is performed for each foreground pixel classified as a foreground marker color and for each image sensor color plane separately utilizing the maximum local background white and the darkest pixel intensities in local patches. Strokes are reconstructed based on spline interpolation of inflection points of cross sections along the length of each stroke for a foreground marker color with a predetermined width. Also provided is an intelligent whiteboard collaboration system including a messaging utility whereby participants based on relevant biometrics information are enabled to access time-lapse whiteboard data and communicate with the system and other participants.

23 Claims, 5 Drawing Sheets

(51) Int. Cl.
*G06K 9/62* (2006.01)
*G06T 1/00* (2006.01)
*H04L 12/18* (2006.01)
*G06F 21/32* (2013.01)
*G06K 9/38* (2006.01)
*H04L 12/58* (2006.01)

(52) U.S. Cl.
CPC .......... *G06K 9/6267* (2013.01); *G06T 1/0007* (2013.01); *H04L 12/1822* (2013.01); *H04L 51/14* (2013.01)

(58) Field of Classification Search
CPC ............. G06F 3/03545; G06F 3/04812; G06F 3/04842; G06F 3/04845; G06F 17/30843; G06F 17/30716; G06F 17/30873; G06F 2216/15; G06F 3/0425; G06F 2203/0382; G06F 3/0416; G06F 3/1423; G06F 17/30244; G06F 21/32; G06F 2203/04104; G06F 3/011; G06F 3/03547; G06F 3/0383; G06F 3/04186; G06F 3/0421; G06F 3/04883; G06K 2009/3225; G06K 9/00375; G06K 9/222; G06K 9/00751; G06K 15/1852; G06K 2009/226; G06K 9/325; G06K 9/38; G06K 9/4647; G06K 9/00288; G06K 9/00577; G06K 9/46; G06K 9/4604; G06K 9/4652; G06K 9/4671; G06K 9/6253; G06K 9/00362; G06K 9/42; G06K 9/00456; G06K 9/6267; G06K 9/00865; G06K 9/00402; H04L 67/025; H04L 12/1818; H04L 29/06; H04L 67/02; H04L 67/142; H04L 67/36; H04L 69/329; G11B 27/28; G11B 27/105; G11B 27/34; H04N 5/77; H04N 7/15; H04N 9/806; H04N 9/3179; H04N 9/3185; H04N 1/2133; H04N 5/23219; H04N 2101/00; G06T 7/20; G06T 7/90; G06T 7/12; G06T 5/009; Y10S 707/99933; Y10S 707/99953; G06Q 10/1095; G06Q 10/101; A63F 2300/69; G09G 3/002; H04M 1/0264

USPC ................ 345/156, 173, 177, 690; 382/276; 725/146, 93, 144
See application file for complete search history.

(56) References Cited

U.S. PATENT DOCUMENTS

| | | | | |
|---|---|---|---|---|
| 8,373,905 | B2* | 2/2013 | Erol | G06K 9/00442 358/1.13 |
| 8,723,789 | B1* | 5/2014 | Rafii | G06F 3/017 345/156 |
| 2001/0035976 | A1* | 11/2001 | Poon | H04N 1/00127 358/1.15 |
| 2003/0028901 | A1* | 2/2003 | Shae | H04N 7/17318 725/146 |
| 2003/0105817 | A1* | 6/2003 | Lapstun | G06Q 10/10 709/204 |
| 2003/0234772 | A1* | 12/2003 | Zhang | G06Q 10/1095 345/177 |
| 2004/0165786 | A1* | 8/2004 | Zhang | G06K 9/32 382/276 |
| 2005/0104864 | A1* | 5/2005 | Zhang | G06F 3/017 345/173 |
| 2005/0180597 | A1* | 8/2005 | Simard | B43L 1/00 382/100 |
| 2006/0256388 | A1* | 11/2006 | Erol | G06K 9/00442 358/3.27 |
| 2009/0309956 | A1* | 12/2009 | Hawkins | G06K 9/00402 348/14.08 |
| 2013/0031457 | A1* | 1/2013 | Griffiths | G06F 40/169 715/231 |
| 2013/0273968 | A1* | 10/2013 | Rhoads | G06K 9/6253 455/556.1 |
| 2014/0169668 | A1* | 6/2014 | Vugdelija | G06F 3/0425 382/165 |
| 2014/0313216 | A1* | 10/2014 | Steingrimsson | G06K 9/00402 345/589 |
| 2015/0002435 | A1* | 1/2015 | Shimizu | G06F 3/04883 345/173 |
| 2015/0077326 | A1* | 3/2015 | Kramer | H04L 67/025 345/156 |
| 2015/0077365 | A1* | 3/2015 | Sasaki | G09G 5/34 345/173 |

* cited by examiner

INTELLIGENT WHITEBOARD COLLABORATION SYSTEMS AND METHODS

BACKGROUND OF THE DISCLOSURE

The present disclosure relates in general to videoconferencing with whiteboard. Specifically, the present disclosure relates to systems and methods for capturing time-stamped whiteboard data and producing high-resolution whiteboard images. More specifically, an intelligent whiteboard video collaboration system including a messaging utility is provided whereby participants based on relevant biometrics information are enabled to access time-lapse whiteboard data and communicate with the system and other participants.

Whiteboard is a mainstay in conducting in-person meetings as well as video conferences across industry and academic settings. However, capturing content or data from whiteboard poses some unique challenges given a variety of artifacts including lighting, reflection on the whiteboard, inadequate resolution of color and strokes, and obstruction by moving objects or people, among other things. Existing video camera and video conferencing hardware is not optimized in capturing whiteboard content and data with desired accuracy and resolution. Although optical character recognition technologies can be applied in general to extract data from a whiteboard, the usability and accuracy of such data is limited.

There is therefore a need for improved methods and systems to capture whiteboard data and generate high-resolution whiteboard images. There is a further need for an optimized whiteboard collaboration system to enable intelligent data access and communications by participants.

SUMMARY OF THE VARIOUS EMBODIMENTS

It is therefore an object of this disclosure to provide methods and systems for extracting content and data from whiteboard and generating high-resolution images. It is a further object of this disclosure to provide utilities to enable intelligent data access to whiteboard content and communication among participants in a whiteboard video conferencing system based on time and relevant biometrics of the participants.

Particularly, in accordance with this disclosure, there is provided, in one embodiment, a method for capturing time-stamped data from whiteboard video signals. The method comprises calculating four corners of a whiteboard thereby defining the whiteboard; determining a background white and identifying background white pixels; performing color normalization for each foreground marker color and each foreground pixel; and reconstructing strokes for each foreground marker color with a pre-determined width. Each stroke is associated with a timestamp based on the whiteboard video signals.

In another embodiment, reconstructing strokes comprises connecting inflection points from cross-sections of a stroke of a foreground marker color along its length thereby creating a pen curve; and rendering a reconstructed stroke based on the pen curve with a pre-determined width.

In yet another embodiment, the pre-determined width is the average width of strokes. In a further embodiment, the pre-determined width is varied for each foreground marker color.

In another embodiment, connecting inflection points comprises applying spline interpolation to the inflection points.

In yet another embodiment, the spline interpolation is smoothing spline interpolation. In a further embodiment, the spline interpolation is cubic smoothing spline interpolation.

In yet another embodiment, defining a whiteboard further comprising detecting a rectangle with white interior; and determining an aspect ratio of the whiteboard. In a further embodiment, defining a whiteboard further comprising applying keystone corrections.

In another embodiment, determining a background white and identifying background white pixels further comprises converting each pixel in the whiteboard into an alternative color space; generating a histogram of clusters of pixels in that color space; and determining the most frequent color. The most frequent color is defined as the background white.

In a further embodiment, the alternative color space is one of the HSV, YCbCr, YPbPr, TSL, CIELAB, and CIELUV space.

In another embodiment, determining a background white and identifying background white pixels further comprises estimating a multitude of local background white for local patches. In yet another embodiment, the local patches are one of 20×20, 50×50, and 75×75 dimension surrounding each of a multitude of pixels. In a further embodiment, the multitude of pixels comprise each pixel in the whiteboard. In another embodiment, estimating a multitude of local background white further comprises performing clustering of pixels in an alternative color space for each local patch.

In another embodiment, the method further comprises generating a binary mask of background white pixels for each local patch; and classifying a pixel as background white if it is background white in over a predetermined percentage of all local patches. In a further embodiment, the predetermined percentage is 90%. In another embodiment, a pixel not classified as background white is classified as a foreground pixel.

According to another embodiment, performing color normalization for each foreground marker color and each foreground pixel further comprises: performing clustering of foreground pixels in an alternative color space, the alternative color space being one of the HSV, YCbCr, YPbPr, TSL, CIELAB, and CIELUV space; classifying a foreground pixel as a foreground marker color based on the clustering, each foreground marker color being defined as the most typical (average or median) color of all pixels classified as that foreground marker color; and generating a binary mask for each foreground marker color.

In another embodiment, the method further comprises for each image sensor color plane, identifying a background white pixel having a local maximum intensity in a local patch surrounding each pixel classified as a foreground marker color; and, normalizing the value of the foreground marker pixel by dividing with the local maximum intensity of the background white pixel. The local patch is one of 20×20, 50×50, and 75×75 dimension surrounding the pixel classified as a foreground marker color.

In yet another embodiment, the method further comprises for each image sensor color plane, in the local patch surrounding the pixel classified as a foreground marker color, identifying a foreground marker color pixel that has a darkest intensity; and, normalizing the value of the pixel classified as a foreground marker pixel by subtracting with the darkest intensity, thereby deriving a normalized gray-scale image for the image sensor color plane.

In a further embodiment, the method further comprises generating a high-resolution gray-scale image by merging the normalized gray-scale image for each image sensor color plane.

In another embodiment, the method further comprises reconstructing a high-resolution color image by applying the most typical (average or median) foreground marker color to each pixel classified as a corresponding foreground marker color in the high-resolution gray-scale image.

In yet another embodiment, intermittent obstruction of view from a moving person is removed by comparing a time sequence of the whiteboard video signals; and capturing whiteboard data only from images that are determined as still.

In accordance with this disclosure, there is provided, in another embodiment, a system for generating time-stamped whiteboard data from raw whiteboard video signals for a whiteboard conference. The system comprises a whiteboard detection unit adapted to detect a whiteboard from the raw whiteboard video image signals; a background unit adapted to define a global background white and classify pixels as background white; a foreground marker unit adapted to define each foreground marker color and classify pixels as a foreground marker color; and a stroke digitizer adapted to reconstruct strokes of each foreground marker color, with each stroke associated with a timestamp based on the raw whiteboard video signals; and a display adapted to render a reconstructed whiteboard image associated with the timestamp.

In yet another embodiment, the stroke digitizer is further adapted to generate a reconstructed stroke by connecting inflection points from cross-sections of a stroke of a foreground marker color along its length thereby creating a pen curve, and rendering the reconstructed stroke based on the pen curve with a pre-determined width.

In a further embodiment, the pre-determined width is the average width of the strokes. In another embodiment, the pre-determined width is varied for each foreground marker color.

In yet another embodiment, the stroke digitizer is further adapted to derive the pen curve by applying spline interpolation to the inflection points. In a further embodiment, the spline interpolation is smoothing spline interpolation. In another embodiment, the spline interpolation is cubic smoothing spline interpolation.

In a further embodiment, the background unit is further adapted to estimate a multitude of local background white for local patches, and generate binary masks for local background white. The local patches are one of 20×20, 50×50, and 75×75 dimension surrounding each of a multitude of pixels. In yet another embodiment, the multitude of pixels comprise each pixel in the whiteboard.

According to another embodiment, the foreground marker unit is further adapted to normalize color for each foreground marker color separately and for each image sensor color plane separately based on a local patch surrounding each foreground pixel classified as a foreground color. In yet another embodiment, the foreground marker unit is further adapted to normalize color based on a local background white maximum and a darkest intensity of a foreground color pixel identified in the local patch.

In a further embodiment, the foreground marker unit is further adapted to generate a separately normalized gray-scale image for each image sensor color plane and thereby generate a high-resolution gray-scale image by combining the separately normalized gray-scale images for each image sensor color plane. In another embodiment, the foreground marker unit is further adapted to reconstruct a high-resolution color image by applying the defined foreground marker color to each pixel classified as a corresponding foreground marker color in the high-resolution gray image.

According to another embodiment, the system further comprises a video stroke reviewer adapted to index reconstructed strokes based on their timestamps, and play in the display a part of the whiteboard video image corresponding to a stroke specified by a user.

In yet another embodiment, the display is further adapted to receive touch-screen input.

In another embodiment, the system further comprises a word detector adapted to search reconstructed strokes based on word input from a user, identify reconstructed strokes corresponding to the word input if any is found, and highlight the reconstructed strokes found with a predetermined color in the display.

In yet another embodiment, the system further comprises a speech detector adapted to search the whiteboard video image signals based on speech input from a user, identify reconstructed strokes corresponding to the speech input if any is found, and highlight the reconstructed stroke found in a predetermined color in the display.

In a further embodiment, the display further comprises a word cloud publisher adapted to display a cloud graphic next to a reconstructed stroke corresponding to a user's input.

In another embodiment, the system further comprises a biometric database adapted to store biometric signatures of a participant of the whiteboard conference, allowing a participant to be identified based on one of a biometric signature of the participant. In yet another embodiment, the biometric database is adapted to store one of stroke, facial, and voice signatures of participants.

In accordance with this disclosure, there is provided, in a further embodiment, a whiteboard video collaboration system for a plurality of participants. The system further comprises a messaging unit adapted to distribute whiteboard data including time-lapse data to a participant based on one of corresponding signatures of the participants in the biometric database.

In another embodiment, the messaging unit is one of Slack, Facebook Workplace, Cisco Spark, Microsoft Teams, HipChat, and Email. In yet another embodiment, the messaging unit is further adapted to recognize whiteboard gestures. Whiteboard gestures comprise square, tap, dot, and hashtag on the whiteboard.

In a further embodiment, the messaging unit is adapted to detect hashtag in the reconstructed whiteboard images; determine a match between the detected hashtag region and predefined user channels; and, post reconstructed whiteboard images in the detected hashtag region to the matched user channel.

According to another embodiment, the display is further adapted to show only reconstructed strokes having a timestamp later than a predetermined time, thereby allowing the plurality of participants to commence a virtual collaboration session from the predetermined time.

In accordance with this disclosure, there is provided, in yet another embodiment, a system for reconstructing an analog whiteboard image. The system further comprises an ink-printer adapted to output a whiteboard printout based on the reconstructed whiteboard image in the display. In a further embodiment, the ink-printer is further adapted to adjust the size of the whiteboard printout.

DETAILED DESCRIPTION OF THE VARIOUS EMBODIMENTS

Figure 1:
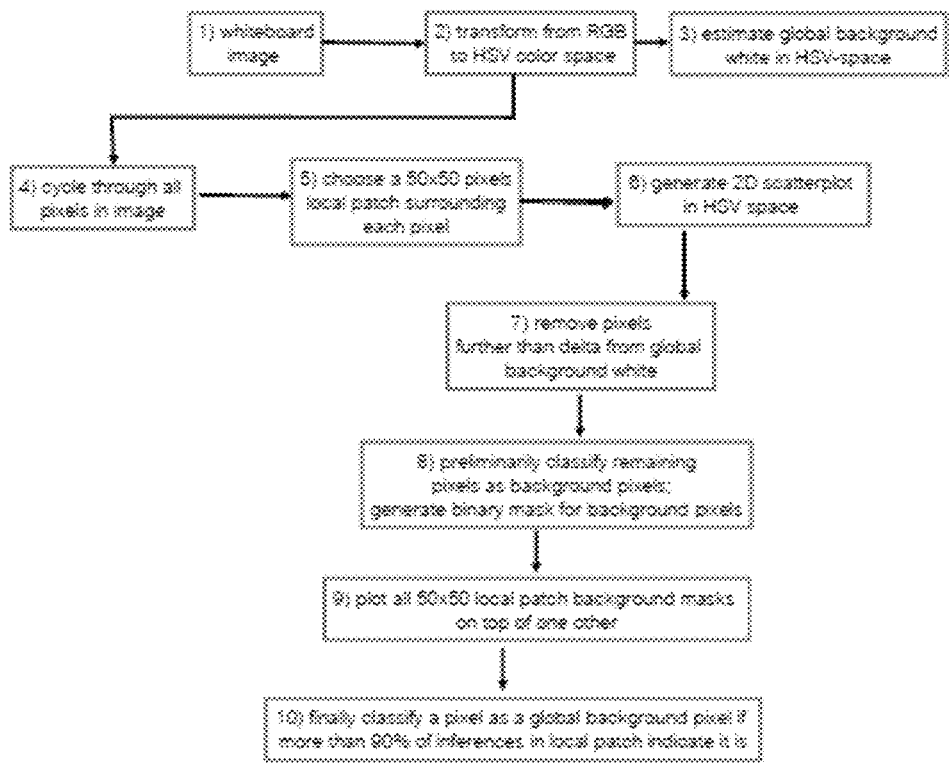
FIG. 1 outlines a method for defining the background white and classifying background white pixels according to one embodiment of this disclosure.

Systems and methods are provided in various embodiments for capturing time-stamped data from whiteboard video signals and producing high-resolution whiteboard images. An intelligent whiteboard collaboration system according to one embodiment includes a messaging utility whereby participants based on relevant biometrics information are enabled to access time-lapse whiteboard data and communicate with the system and other participants.

Clustering is performed according to another embodiment in an alternative color space globally as well as locally in defining background white and foreground marker colors. In certain embodiments, local patches surrounding a multitude of pixels in the whiteboard are used in classifying background white pixels and foreground color pixels for each foreground marker color. Color normalization is performed according to one embodiment for each foreground pixel classified as a foreground marker color and for each image sensor color plane separately utilizing maximum local background white and darkest pixel intensities in local patches. Strokes are reconstructed in another embodiment based on spline interpolation of inflection points of cross sections along the length of each stroke for a foreground marker color with a predetermined width.

1. Whiteboard Detection and Background Optimization

To capture whiteboard content, a camera in certain embodiments has a wide field of view (e.g., 100-180 degree HFOV), a high-resolution sensor (e.g., greater than 12 MP), and optic lens with a resolving power greater than the image sensor. Such camera in a particular embodiment has a dual image pipeline, with one for video stream allowing digital pan-tilt-zoom (PTZ) operations and the other for whiteboard content.

In one embodiment, the whiteboard region of the image is detected by inspection of features related to a whiteboard, including rectangles containing white interior and four corners of such a rectangle. In another embodiment, the whiteboard plane is not perpendicular to the camera optical axis and an aspect ratio is determined. Keystone corrections are performed subsequently in other embodiments to allow for a correct capture of the whiteboard.

In an alternative embodiment, a user or participant of the intelligent whiteboard collaboration system is given an option to confirm if the system-detected region is in fact a whiteboard input region. In another embodiment, a user or participant is given an option to identify or confirm the four corners of the whiteboard.

Intermittent movements of people or objects within the whiteboard view are recorded and ascertained by comparing changes in a sequence of images. According to another embodiment, only parts of the image classified as "still" are retained and used in the whiteboard detection and data capture. This allows the full capture of the whiteboard and its content free of intermittent obstruction of view, under the assumption that no part of the whiteboard is permanently obscured from the camera view during the entire sequence of the whiteboard video capture.

Once the whiteboard is detected or defined, a background white of the whiteboard is determined and background white pixels are classified.

Due to common artifacts such as those from cast shadow and unclean surfaces of whiteboards, the background white of a whiteboard is often not a perfect shade of white consistently. This poses problems in generating whiteboard images with desirable resolution and extracting whiteboard content with desirable accuracy. The systems and methods of this disclosure mitigate these problems and optimize whiteboard background determination utilizing data from local patches that surround each pixel.

In one embodiment, clustering of pixels in an alternative color space is performed. The alternative color space is the HSV, YCbCr, YPbPr, TSL, CIELAB, or CIELUV space. For example, after initial demosaicking, pixels are transformed from the RGB space to the HSV space. See FIG. 1 (2). A two-dimensional histogram of pixels (hue and saturation) in the HSV space is generated, and a clustering analysis is performed. The color (hue and saturation) with the highest frequency is determined as the (global) background white according to one embodiment, assuming most of the pixels in the whiteboard is background white. See FIG. 1 (3).

In a further embodiment, median filtering is optionally performed with a small margin of pixels (5×5) for each background white pixel and for each color channel separately.

Referring to FIG. 1 (4-6), a local patch of pixels with a relatively small dimension, e.g., 20×20, 50×50, or 75×75, are selected surrounding each pixel. Two-dimensional hue-saturation scatterplots are generated in the HSV space for such local patches. Pixels that are further than delta from the (global) background white are removed in one embodiment; the remaining pixels are preliminarily classified as background white pixels. See FIG. 1 (7-8). Binary masks for background white pixels are generated for all local 50×50 patches. See FIG. 1 (9). An AND-operator is applied on all local patches in one embodiment, thereby confirming the classification of a (global) background white pixel only if it is background white in all local patches. In an alternative embodiment, an OR-operator is applied on local patches, thereby confirming the classification of a (global) background white pixel if it is indicated as background white in at least one of the local patches.

In another embodiment, a pixel is finally classified as a (global) background white pixel if it is background white in over a predetermined percentage of local patches. The predetermined percentage is 90% in some embodiments. See FIG. 1 (10).

2. Color Normalization

All pixels not classified as background white pixels are deemed foreground pixels. Pixels may be preliminarily classified as foreground pixels belonging to a foreground marker color after an initial demosaicking process. Subsequent to the determination of the background white and the classification of background white pixels in one embodiment, the remaining pixels are confirmed as foreground pixels. Further processing and advanced color normalization is then performed to the foreground pixels.

Figure 2:
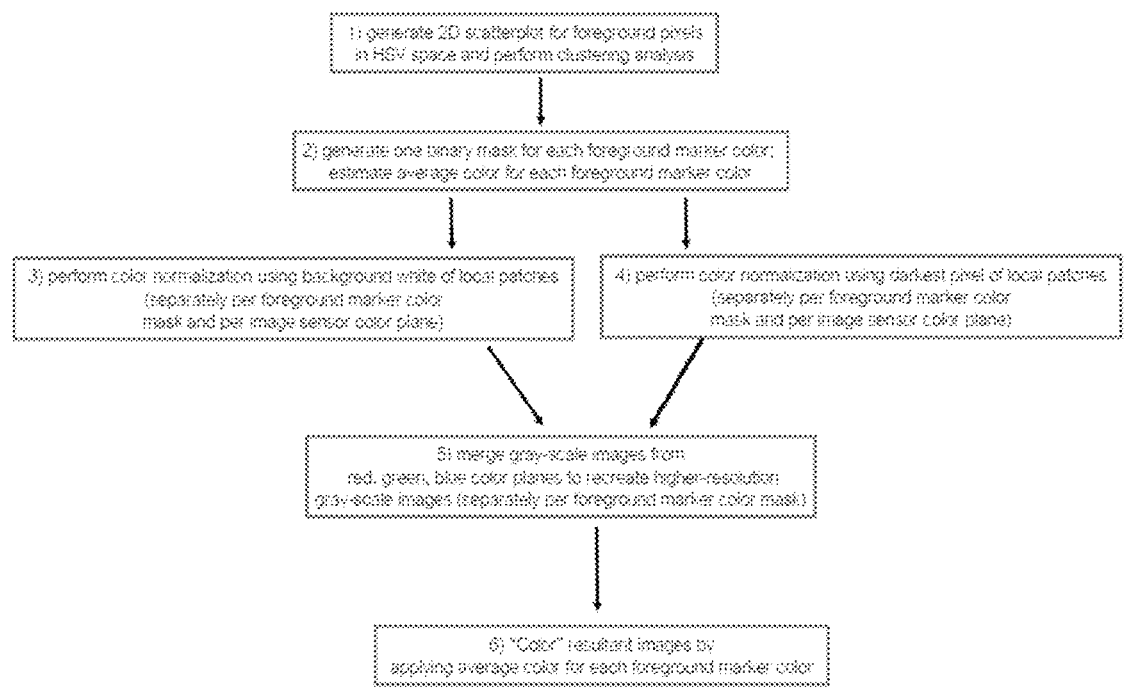
FIG. 2 outlines a method for color normalization of foreground marker colors and classification of foreground marker color pixels according to another embodiment.
Figure 3:
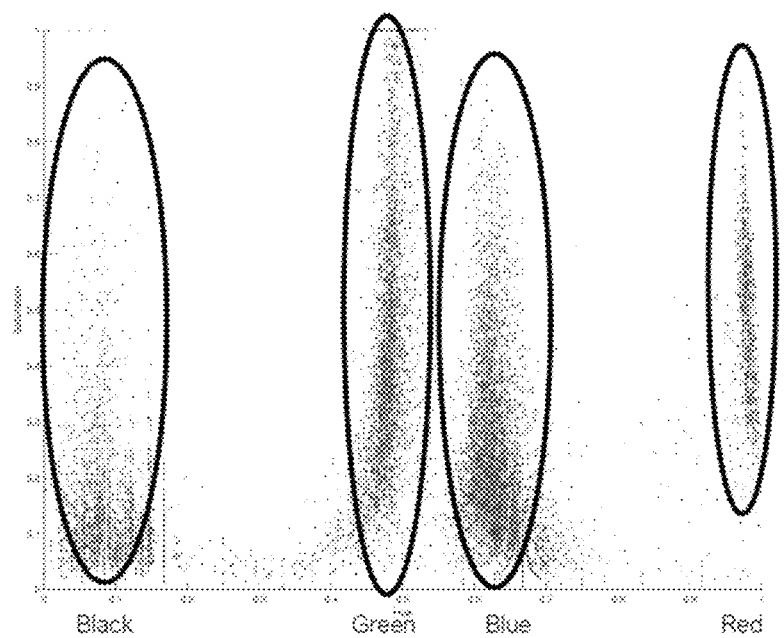
FIG. 3 depicts a histogram of clusters of pixels for foreground marker color normalization according to another embodiment.

Referring to FIG. 2 (1), for example, a two-dimensional histogram of clusters of foreground pixels is generated in an alternative color space such as the HSV space. Clustering analysis is performed to unique foreground marker colors. In one embodiment, a maximum of 12 foreground marker colors are permitted in the intelligent whiteboard collaboration system of this disclosure. Referring to FIG. 3, for example, four distinct clusters here (black, green, blue, red) distinguish each foreground marker color from one another. Hue on the x-axis is the primary differentiator in this clustering analysis.

Based on the clustering analysis, a binary mask for each foreground marker color is generated. The most typical color (average or median) for each foreground marker color is estimated, which is determined as that foreground marker color according to one embodiment. See FIG. 2 (2).

In certain embodiments, a small margin of a predetermined number of pixels around each foreground marker pixel is added to allow for dilation of foreground marker pixels for further processing. The small margin is 5×5 in one embodiment.

Referring to FIG. 2 (3), for each image sensor color plane separately, the value of each foreground color pixel is normalized by dividing with a local maximum intensity of background white pixels in a local patch surrounding that foreground color pixel. The local patch is of the dimension of 20×20, 50×50, or 75×75 pixels surrounding each foreground color pixel in various embodiments. Referring to FIG. 2 (4), for each image sensor color plane separately, the value of each foreground color pixel is further normalized by subtracting with the darkest intensity of foreground pixels in a local patch surrounding that foreground color pixel.

Figure 4:
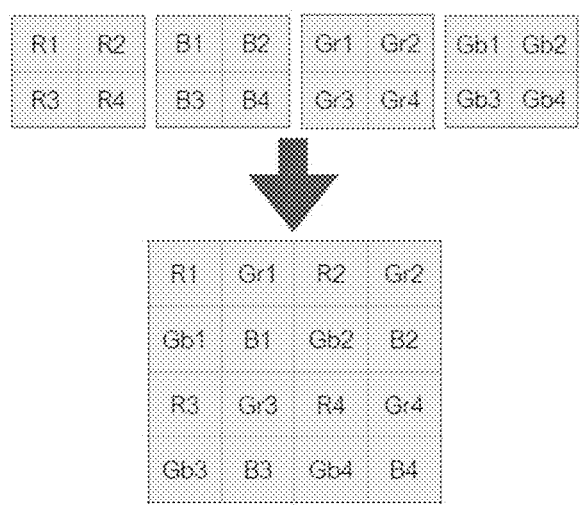
FIG. 4 depicts individual color planes being merged to generate a high-resolution gray-scale image according to another embodiment.

Subsequent to the above local patch-based normalization using the maximum background white pixel and the darkest foreground color pixel in the bayer domain, a normalized gray-scale (black-and-white) image for each image sensor color plane is generated. Referring to FIG. 4, in one embodiment a high-resolution gray-scale image is then created by merging individual color planes. Specifically, as shown here, the four normalized image sensor color planes R, B, Gr, Gb are merged into one black-and-white image. Pixel positions are shifted corresponding to the bayer pattern pixels sites of the image sensor.

Lastly and to complete color normalization according to one embodiment, all foreground pixels in the high-resolution gray-scale image are "colored" by applying the most typical color (average or median) of the corresponding foreground marker color, thereby reconstructing a high-resolution color image of the whiteboard. See FIG. 3 (6).

3. Stroke Reconstruction

Strokes of all foreground marker colors are reconstructed or "digitized" to improve the resolution and consistency of the resultant whiteboard images and the accuracy of whiteboard data and content for access in the intelligent whiteboard collaboration system according to one embodiment of this disclosure.

Figure 5:
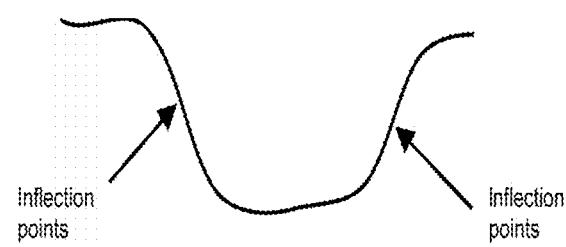
FIG. 5 depicts inflection points for stroke reconstruction according to another embodiment.

Referring to FIG. 5, operating on gray-scale images, the steepest ascent and descent of each stroke are examined and inflection points from cross-sections of the strokes are identified. A pen curve is created by connecting the inflection points, and a reconstructed stroke is rendered based on the pen curve, adopting a pre-determined width. The pre-determined width in one embodiment is the average width of all strokes of a corresponding foreground marker color. Reconstructed strokes for different foreground marker colors adopt varied widths according to another embodiment. The stroke width of each foreground color may be selected by a user of the whiteboard collaboration system in a certain embodiment.

According to one embodiment, spline interpolation is performed in connecting the inflection points, and smoothing splines or cubic smoothing splines are created thereby deriving the corresponding pen curves in alternative embodiments.

In summary and according to various embodiments, upon background optimization, color normalization, and stroke reconstruction, the resultant reconstructed whiteboard images present a consistent white background, uniformly colored strokes, and a resolution that is a number of times greater compared to the native resolution of the image sensor.

4. Intelligent Whiteboard Collaboration System

According to one embodiment, the system of this disclosure is adapted to generate time-stamped whiteboard data from raw whiteboard video signals for whiteboard conferencing. The system comprises a whiteboard detection unit, a background unit, a foreground marker unit, a stroke digitizer, and a display. Each component or unit in the system, including each of the additional components discussed below, may be hardware, software, firmware, or combinations thereof in various embodiments. Each component is electronically or digitally connected to one another, whereby data and signals are transmitted within the system and among these components. The display in an alternative embodiment is wirelessly connected to the other components of the system. The system includes a multitude of displays in another embodiment, each operated or utilized by an individual user or participant of a whiteboard conference.

The whiteboard detection unit is adapted to detect and define a whiteboard from raw whiteboard video image signals. It removes any non-whiteboard regions of the image signals. Various methodologies are utilized in the detection of the whiteboard as discussed above in Section 1 of this Detailed Description of the Various Embodiments.

The background unit is adapted to define a global background white as the background white and classify pixels as background white. The background unit utilizes optimization techniques as discussed above in Section 1 of this Detailed Description to improve the consistency of the background white definition and the accuracy of the background white pixel classification. See e.g., FIG. 1. For example, the background unit relies on data from local patches surrounding a multitude of pixels in the whiteboard in classifying background white pixels. The background unit performs clustering of pixels in alternative color spaces globally and locally in defining background white, and generate binary masks for background white as discussed above. See e.g., FIG. 1.

The foreground marker unit is adapted to define each foreground marker color and classify pixels as a foreground marker color. The foreground marker unit employs various methods as discussed above in Section 2 of this Detailed Description of the Various Embodiments to perform color normalization on foreground pixels. See e.g., FIG. 2. For example, the foreground marker unit utilizes local maximum background white and the darkest pixel intensities in local patches surrounding each foreground pixel to normalize its color for each image sensor color plane separately.

The foreground marker unit in a further embodiment generates a separately normalized gray-scale image for each image sensor color plane, and merges such gray-scale images for individual color planes to form a higher-resolution gray-scale image. See e.g., FIG. 4. The foreground marker unit is further adapted to reconstruct a high-resolution color image by applying the defined foreground marker color to each pixel classified as a corresponding foreground marker color in the higher-resolution gray image. The defined foreground marker color is the average or median of that particular foreground marker color in one embodiment.

The stroke digitizer is adapted to reconstruct or digitize strokes of each foreground marker color. Each stroke is associated with a timestamp based on the raw whiteboard video signals. The stroke digitizer employs various methods as discussed above in Section 3 of this Detailed Description of the Various Embodiments to reconstruct strokes of each foreground marker color. See, e.g., FIG. 5.

The display of this disclosure is adapted to render reconstructed whiteboard images containing timestamp information. The display according to various embodiments is one of computer terminals, tablets, smart phones, internet-of-things ("IoT") terminals, and virtual reality or augmented reality (VR/AR) display devices. The display is touch-screen enabled in one embodiment. The display is voice-input enabled in another embodiment. A user or participant of the whiteboard collaboration system has access to different types of displays, all of which are enabled to communicate with the system and the other displays. Such communication is wired, wireless, via Bluetooth, or other network connections in alternative embodiments.

In another embodiment, the system further comprises a video stroke reviewer connected to the display. The stroke reviewer is adapted to index reconstructed strokes based on their timestamps, and play in the display segments of the whiteboard video image corresponding to one or more strokes of interest specified by a user. The user may specify the length of time for the segments of the video to be reviewed. In one embodiment, the user indicates the stroke or strokes of interest by highlighting them in a touch-screen enabled display. In another embodiment, the user indicates such interest by circling the strokes with a mouse cursor. The video stroke reviewer is part of the display in an alternative embodiment. In another embodiment, the video stroke reviewer coupled to the display is adapted to display a time-lapse sequence of reconstructed strokes based on the user's interest.

The system in a further embodiment includes a word detector connected to the display. The word detector is adapted to search reconstructed strokes based on word input from a user, and identify reconstructed strokes corresponding to the word input if any is found. The word detector is adapted to receive keyboard input or touch screen input. The word detector is further adapted to highlight the reconstructed strokes in the display in a predetermined color. The predetermined color is selected by the user according to one embodiment, and the predetermined color is not any foreground marker color recognized in the system in order to avoid confusion.

In another embodiment, the system includes a speech detector connected to the display. The speech detector is capable of voice recognition. It is adapted to search the whiteboard video image signals based on speech input from a user, and identify reconstructed strokes corresponding to the speech input if any are found. The speech detector is further adapted to highlight the reconstructed strokes in the display in a predetermined color. According to one embodiment, the predetermined color is selected by the user. To avoid confusion, the predetermined color excludes any color that is the same as any foreground marker color recognized in the system.

In an additional embodiment, the display further includes a word cloud publisher therein. The word cloud publisher is adapted to display a cloud graphic next to a reconstructed stroke corresponding to a user's input. The word cloud publisher is a software utility in one embodiment, and enables the user to annotate or comment directly on the reconstructed whiteboard images. In an alternative embodiment, the word cloud publisher displays key words of interest to a user or participants based on the stroke or strokes of interest.

The intelligent whiteboard collaboration system of this disclosure in a further embodiment includes a biometric database. The biometric database stores biometric signatures of all participants of the whiteboard conference or users of the intelligent whiteboard collaboration system. It allows a participant or user to be identified based on one of a biometric signature of the participant, including stroke, facial, and voice signatures. The database also includes other identifying information of the participants or users, including names, positions, organizations, and interests. Such a system is intelligent in the sense that it is knowledgeable about its users or participants, including their identities, biometric signatures, and interests among other things. The intelligent whiteboard collaboration system of this disclosure thus enables smart information sharing and communications by and among its users or participants, using utilities or components such as a messaging unit discussed below.

The intelligent whiteboard collaboration system includes a messaging unit according to certain embodiments. The messaging unit is adapted to distribute whiteboard data including time-lapse data to a participant based on relevant biometric signatures or other identifying information of the participant, and to allow participants to communicate with one another. For example, the messaging unit may post or relay all stroke data under the red marker to a participant using the red marker in the whiteboard conference. That participant may also request a graph of interest in the whiteboard to be forwarded via the messaging unit to another participant. In various embodiments, the messaging unit is Slack, Facebook Workplace, Cisco Spark, Microsoft Teams, HipChat, or Email in various embodiments.

The messaging unit is further adapted to recognize whiteboard gestures in another embodiment. These gestures include square, tap, dot, and hashtag on the whiteboard, and may be present in the raw whiteboard video signals or inserted by a user in the reconstructed whiteboard images according to alternative embodiments.

The messaging unit is adapted in a certain embodiment to detect hashtag in the whiteboard images, and to determine a match between the detected hashtag region and predefined user channels. If there is a match, the messaging unit posts whiteboard images in the hashtag region to the matched user channel. The match may be based on word or voice input from a user or participant, or other criteria indicated by the user and supported by the system.

According to a further embodiment, the display is adapted to show only reconstructed strokes having a timestamp that is later than a predetermined time. This allows participants to commence a virtual collaboration session using the intelligent whiteboard collaboration system from a predetermined time. In practice, this feature also enables users to virtually "erase" content of the whiteboard that are older than a predetermined time, and thereby filter out irrelevant data.

The system via the messaging unit may distribute such whiteboard time-lapse content demarcated by a predetermined time as a meeting summary after a whiteboard conference to participants and even people in an organization who have not been able to attend the conference.

In an additional embodiment of this disclosure, the system further includes an ink-printer connected to the display, either wirelessly or via wired connections. The ink printer is adapted to output a whiteboard printout based on the reconstructed whiteboard image in the display. The ink-printer in a further embodiment is further adapted to adjust the size of the whiteboard printout.

The descriptions of the various embodiments herein, including the drawings and examples, are to exemplify and not to limit the invention and the various embodiments thereof.

We claim:

1. An intelligent whiteboard collaboration system for a plurality of participants, comprising:
   a whiteboard detection unit adapted to receive the raw whiteboard video images and detect the whiteboard;
   a background unit adapted to define a global background white and classify pixels as background white;
   a foreground marker unit adapted to define each foreground marker color and classify pixels as a foreground marker color;
   a stroke digitizer adapted to reconstruct strokes of each foreground marker color by (i) connecting inflection points from cross-sections of a stroke of a foreground marker color along its length thereby creating a pen curve, wherein said inflection points are identified from examining the steepest ascent and descent in cross-sections of the stroke on gray-scale images, and (ii) rendering the reconstructed stroke based on the pen curve with a pre-determined width, wherein each stroke is associated with a timestamp based on the raw whiteboard video images;
   a display adapted to render a reconstructed whiteboard image associated with the timestamp;
   a biometric database adapted to store biometric signatures of a participant of the whiteboard conference, thereby allowing a participant to be identified based on one of the biometric signatures of the participant; and
   a messaging unit adapted to distribute time-stamped whiteboard data to a participant based on one of corresponding signatures of the participants in the biometric database.

2. The system of claim 1, further comprises a video stroke reviewer adapted to index reconstructed strokes based on their timestamps and play in the display a part of the whiteboard video image corresponding to a stroke specified by a user.

3. The system of claim 2, wherein the display is further adapted to receive touch-screen input.

4. The system of claim 3, further comprising a word detector adapted to search reconstructed strokes based on word input from a user, identify reconstructed strokes corresponding to the word input if any is found, and highlight the reconstructed strokes with a predetermined color in the display.

5. The system of claim 4, further comprising a speech detector adapted to search the whiteboard video image signals based on speech input from a user, identify reconstructed strokes corresponding to the speech input if any is found, and highlight the reconstructed stroke with a predetermined color in the display.

6. The system of claim 5, wherein the display further comprises a word cloud publisher adapted to display a cloud graphic next to a reconstructed stroke corresponding to a user's input.

7. The system of claim 6, wherein the biometric signatures are one of stroke, facial, and voice signatures.

8. The system of claim 7, wherein the messaging unit is one of Slack, Facebook Workplace, Cisco Spark, Microsoft Teams, HipChat, and Email.

9. The system of claim 8, wherein the messaging unit is further adapted to recognize whiteboard gestures, and wherein the whiteboard gestures comprise square, tap, dot, and hashtag on the whiteboard.

10. The system of claim 9, wherein the messaging unit is adapted to (i) detect hashtag in a reconstructed whiteboard image, (ii) determine a match between the detected hashtag region and predefined user channels; and, (iii) post the reconstructed whiteboard image in the detected hashtag region to the matched user channel.

11. The system of claim 10, wherein the display is further adapted to show only reconstructed strokes having a timestamp later than a predetermined time, thereby allowing the plurality of participants to commence a virtual collaboration session from the predetermined time.

12. The system of claim 1, wherein the pre-determined width is the average width of the strokes.

13. The system of claim 12, wherein the pre-determined width is varied for each foreground marker color compared to the other foreground marker colors.

14. The system of claim 13, wherein the stroke digitizer is further adapted to derive the pen curve by applying spline interpolation to the inflection points.

15. The system of claim 14, wherein the spline interpolation is smoothing spline interpolation.

16. The system of claim 14, wherein smoothing spline interpolation is cubic smoothing spline interpolation.

17. The system of claim 12, wherein the background unit is further adapted to estimate a multitude of local background white for local patches and generate a binary mask for background white.

18. The system of claim 17 wherein the local patches are one of 20×20, 50×50, and 75×75 dimension surrounding each of a multitude of pixels.

19. The system of claim 18, wherein the multitude of pixels comprise each pixel in the whiteboard.

20. The system of claim 12, wherein the foreground marker unit is further adapted to normalize color for each foreground marker color separately and for each image sensor color plane separately based on a local patch surrounding each foreground pixel classified as a foreground color.

21. The system of claim 20, wherein the foreground marker unit is further adapted to normalize color based on a maximum local background white and a darkest intensity of a foreground color pixel identified in the local patch.

22. The system of claim 21, wherein the foreground marker unit is further adapted to generate a separately normalized gray-scale image for each image sensor color plane and thereby generate a high-resolution gray-scale image by combining the separately normalized gray-scale images for each image sensor color plane.

23. The system of claim 22, wherein the foreground marker unit is further adapted to reconstruct a high-resolution color image by applying the defined foreground marker color to each pixel classified as a corresponding foreground marker color in the high-resolution gray image.

* * * * *